B. J. CLOES.
FRUIT CLIPPING AND PRUNING INSTRUMENT.
APPLICATION FILED NOV. 4, 1909.
974,553.
Patented Nov. 1, 1910.
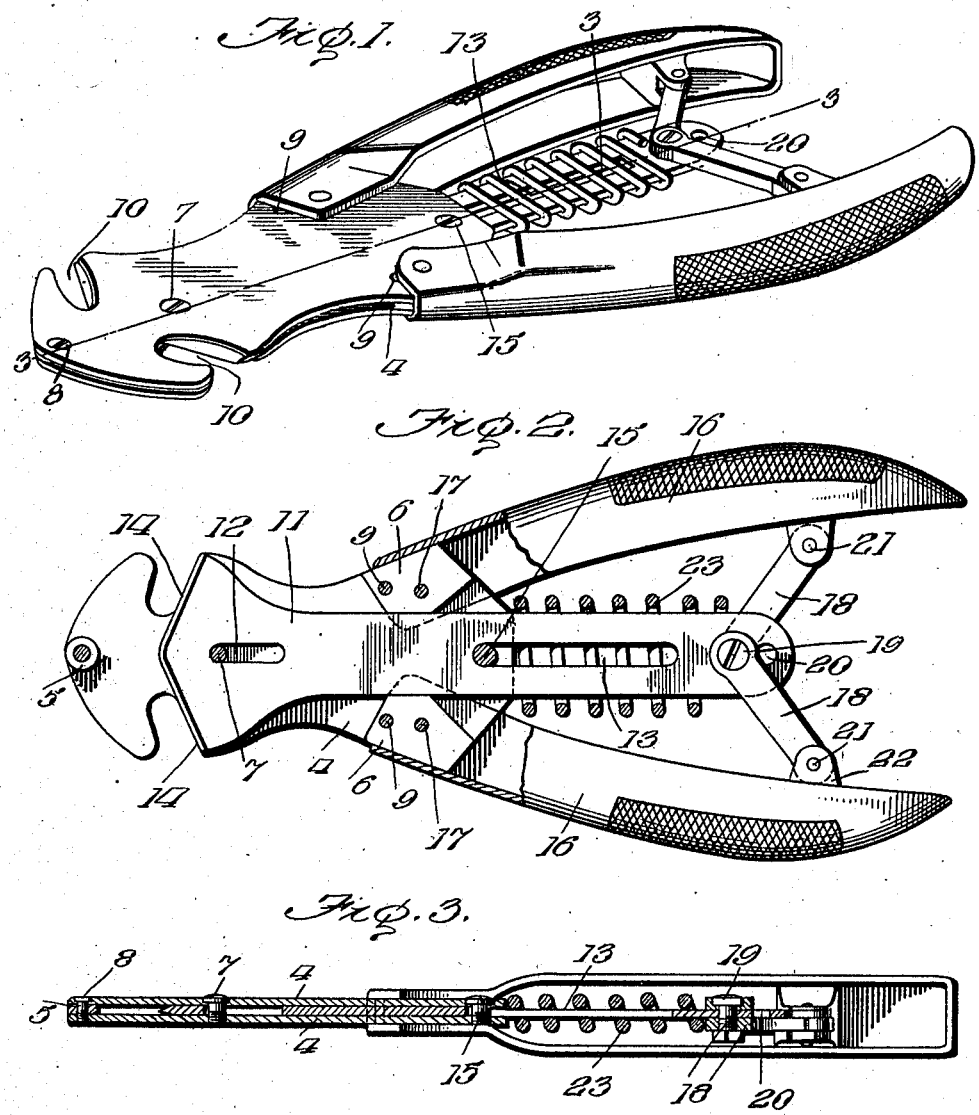
Witnesses
L. B. Baker
K. E. Klein
Inventor
B. J. Cloes
By Dudley, Browne & Phelps
Attorneys

UNITED STATES PATENT OFFICE.

BENJAMIN J. CLOES, OF HIGHLAND, CALIFORNIA.

FRUIT-CLIPPING AND PRUNING INSTRUMENT.

974,553.   Specification of Letters Patent.   Patented Nov. 1, 1910.

Application filed November 4, 1909. Serial No. 526,307.

*To all whom it may concern:*

Be it known that I, BENJAMIN J. CLOES, a citizen of the United States, residing at Highland, in the county of San Bernardino and State of California, have invented certain new and useful Improvements in Fruit-Clipping and Pruning Instruments, of which the following is a specification.

My invention relates to certain new and useful improvements particularly designed for removing fruit such as oranges from trees, and which will enable the stem to be cut short or close to the fruit without injuring the latter and which will enable the operation to be easily and quickly performed.

While this is the primary object of my invention, it is to be understood that the same can also be used for a pruning instrument for trees and vines or any other purpose that may be found desirable.

With these and other objects in view my invention consists in certain constructions, combinations and arrangements of parts the preferred form of which will be first described in connection with the accompanying drawings and then the invention particularly pointed out in the appended claim.

Referring to the drawings wherein the same part is designated by the same reference numeral wherever it occurs Figure 1 is a perspective view of a clipper embodying my invention; Fig. 2 is a plan view thereof partly in central section to more clearly illustrate the construction, and Fig. 3 is a central longitudinal section taken on line 3, 3 of Fig. 1.

In carrying out the invention 4, 4 designate a pair of plates which form the main portion or head of the device. These plates are separated from each other by means of the washer 5 and the blocks 6, 6, the plates being held together by the screws 7, 8, 9, 9, the screws 7 passing through the central portion of the head, the screw 8 through the outer end of the head through the washer 5 and the screws 9, 9 passing through the blocks 6, 6, whereby the two plates are secured to each other and held a slight distance apart. On opposite sides of the head near the outer end I provide openings 10, 10.

11 is the cutter blade longitudinally slotted at 12 and 13, and provided at its forward end with the knife edges 14 arranged at an obtuse angle to each other. The blade 11 is located between the plates 4, 4 with the screw 7, passing through the slot 12 and a screw 15, which passes through the inner ends of the plates 4, passing through the slot 13, whereby the blade 11 will move in a right line between the plates 4, 4, causing the knife edges 14 to pass across the recesses or openings 10.

16, 16 are handles pivoted to the head of the device at 17, 17.

18, 18 are a pair of toggle arms pivoted to the bolt 19 mounted in one of a plurality of openings 20 in the rear of the blade 11. The outer end of each arm is pivoted at 21 to a lug 22 carried by an arm 16.

23 is a spring surrounding the rear portion of the blade 11 between the ends of the toggle 18 and the rear end of the head of the device, said spring being adapted to return the parts to the position shown in Fig. 1 after the handles have been compressed together to force the knife edges 14 across the recesses 10.

In the operation of my device it will be noted that the plates 4 can be made very thin, so that the cutting of the stem will be very close to the fruit where the same is used as a fruit cutter, and that by having the cutter operate on either side of the head the device can be operated more rapidly than would be the case were only one cutting opening provided.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is—

An implement of the character described, comprising a head formed of a pair of plates separated from each other, recesses formed on the opposite sides of the plates at the forward portion thereof, a pair of handles pivotally connected to the plates at the rear portion thereof, a blade mounted for reciprocal movement between the plates, said blade at one end being provided with cutting edges in position to be forced across the recesses, and links connecting the rear end of said blade to the handles.

In testimony whereof I affix my signature in presence of two witnesses.

BENJAMIN J. CLOES.

Witnesses:
T. G. ECKLES,
C. F. SPATES.